United States Patent [19]

Crute

[11] 4,162,021

[45] Jul. 24, 1979

[54] PRESSURE-VACUUM RELIEF FUEL TANK CAP WITH ROLL-OVER SAFETY VALVE FEATURE

[75] Inventor: Billy G. Crute, Connersville, Ind.

[73] Assignee: Stant Manufacturing Company, Inc., Connersville, Ind.

[21] Appl. No.: 616,960

[22] Filed: Sep. 26, 1975

Related U.S. Application Data

[63] Continuation-in-part of Ser. No. 548,035, Feb. 7, 1975, abandoned, which is a continuation-in-part of Ser. No. 510,483, Sep. 30, 1974, Pat. No. 3,938,692.

[51] Int. Cl.² ............................................ B65D 51/16
[52] U.S. Cl. ..................................... 220/202; 137/43; 137/533.15; 220/203; 220/303
[58] Field of Search ............................. 137/43, 533.15; 220/203, 303, 202

[56] References Cited

U.S. PATENT DOCUMENTS

| 2,682,281 | 6/1954 | Ecker | 137/533.15 |
| 3,346,008 | 10/1967 | Scaramucci | 137/533.15 |
| 3,610,263 | 10/1971 | Walters | 137/43 |
| 3,757,987 | 9/1973 | Marshall | 220/303 |

*Primary Examiner*—Allan N. Shoap
*Attorney, Agent, or Firm*—Jenkins, Coffey, Hyland, Badger & Conard

[57] ABSTRACT

A pressure-vacuum cap for a chamber such as an automobile gas tank having a normally upwardly extending filler neck formed with a peripherally and radially extending, upwardly facing sealing surface concentric with the longitudinal axis of the neck, the cap comprising a cover, a concentric housing extending downwardly from the cover into the filler neck and a gasket or gaskets providing a seal between the housing and the sealing surface, the housing providing a valve body having a centrally disposed, concentric passageway extending axially therethrough and in communication with the chamber. A pressure-vacuum valve assembly is disposed in that passageway for normalizing the pressure in the chamber, venting the chamber to atmosphere when the pressure in the chamber exceeds a predetermined superatmospheric level and when the pressure in the chamber drops below a predetermined subatmospheric level. The cap also provides, in addition to the pressure-vacuum valve assembly, a roll-over valve assembly. Particularly, a rubber-like insert is disposed in the passageway to provide a downwardly facing, generally conical valve seat, and a ball is disposed in the passageway to move against the valve seat to close the passageway against movement of fluid from the chamber when the filler neck is tilted downwardly to a predetermined angle relative to a horizontal plane. The rubber-like insert also provides a seal against the pressure-vacuum valve assembly.

5 Claims, 7 Drawing Figures

PRESSURE-VACUUM RELIEF FUEL TANK CAP WITH ROLL-OVER SAFETY VALVE FEATURE

This is a continuation-in-part application based upon my pending application Ser. No. 548,035 filed Feb. 7, 1975, now abandoned as a continuation-in-part of application Ser. No. 510,483, filed Sept. 30, 1974, now U.S. Pat. No. 3,938,692, issued Feb. 17, 1976.

The present invention relates to fuel storage tank caps, and more particularly to the provision of a cap for an automobile fuel tank, which cap has valve means therein for venting the chamber to atmosphere when the pressure in the chamber exceeds a predetermined superatmospheric level and when the pressure in the chamber drops below a predetermined subatmospheric level and, in addition, roll-over valve means effective to prevent the flow of gas through the pressure-vacuum valve means if the automobile is rolled over in an accident. The pressure-vacuum valve means comprises, generally, a pair of valves which are normally closed and which automatically open in response to predetermined pressure changes in the fuel tank. One valve, the pressure valve, functions to release excess vapors in the tank when the pressure exceeds a predetermined level. The other valve, the vacuum valve, functions to control the inhalation of atmospheric air when the pressure in the tank drops below a predetermined subatmospheric level. The pressure-vacuum valve arrangement is designed and required for protection of the environment.

The prior art contains several examples of inventors' efforts to solve the problem of providing pressure-vacuum valves and even roll-over valves in caps of fuel tanks. U.S. Pat. No. 3,757,987 issued Sept. 11, 1973 in U.S. Class 220/204, 137/43 discloses a cap with a combination pressure-vacuum valve and roll-over valve on the filler neck of a fuel tank. The Dawson Friend U.S. Pat. No. 3,820,680 issued June 28, 1974 in U.S. Class 220/203, 220/303 discloses a gas cap with the pressure-vacuum valve means therein. Such a pressure-vacuum valve means is also disclosed in the Robert Rodgers patent application Ser. No. 307,821, now U.S. Pat. No. 3,831,801.

Reference is made to other United States patents showing various valve arrangements and caps with valve arrangements including roll-over valve arrangements as follows:

| Inventor | Pat. Number | Issued | Class | Subclass |
|---|---|---|---|---|
| Jensen | 1,893,942 | 1/33 | 137 | 43 |
| Snyder | 2,273,737 | 2/42 | 277 | 71 |
| Abrams | 2,396,233 | 3/46 | 220 | 203 |
| Knowlton | 2,489,787 | 11/49 | 220 | 207 |
| McKalip | 2,496,883 | 2/50 | 220 | 203 |
| Alkire, et al. | 3,064,668 | 11/62 | 137 | 43 |
| Bowden | 3,083,862 | 4/63 | 220 | 202 |
| Marx | 3,123,087 | 3/64 | 137 | 43 |
| Osborne | 3,135,411 | 6/64 | 215 | 309 |
| Colarusso et al. | 3,465,911 | 9/69 | 220 | 86. at |
| White | 3,500,843 | 3/70 | 137 | 43 |
| De Frees | 3,568,695 | 3/71 | 137 | 43 |
| Pfrengle | 3,614,960 | 10/71 | 137 | 43 |
| Hall | 3,738,384 | 6/73 | 137 | 493.9, 512.3 512.5 |

U.S. Pat. No. 2,396,233 shows a float chamber in a filler cap and relief vent, the chamber carrying a needle valve for closing a valve opening and the chamber being driven by a steel ball. U.S. Pat. No. 3,123,087 shows a venting cap with a ball 15 arranged to raise a plate to close the passageway during roll-over. The Pfrengle U.S. Pat. No. 3,614,960 shows a venting valve and roll-over valve arrangement remote from the filler cap. U.S. Pat. No. 3,738,384 shows a single valve having five different functions, i.e., pressure relief, vacuum relief, roll-over shut-off, overfill limiting and anti-surge control.

While the prior art has many examples of pressure-vacuum valves and roll-over vacuum valves, the combination valve arrangement of the present invention constitutes a significant improvement over the prior art because it is low in cost, easy to manufacture, and yet very effective for the purpose intended.

An object of the present invention, therefore, is to provide an improved pressure-vacuum valve venting vehicle fuel tank cap with a roll-over valve means effective to close the venting passageway through the cap if the vehicle rolls over, the roll-over valve means including a rubber-like insert providing a roll-over ball valve seat as well as a means for sealing a pressure-vacuum valve assembly in the cap.

It is an object of the present invention to provide such a pressure-vacuum cap for a tank having a normally upwardly-extending filler neck formed with a peripherally and radially extending, upwardly facing sealing surface concentric with the longitudinal axis of the neck, the cap comprising a cover, means providing a concentric housing extending downwardly into the filler neck and connected to the cover, means providing a seal between the housing means and the sealing surface, and the housing means including a valve body providing a centrally disposed concentric passageway extending axially therethrough and in communication with the chamber. Pressure-vacuum valve means is disposed in the passageway for normalizing the pressure in the chamber, venting the chamber to atmosphere when the pressure in the chamber exceeds a predetermined superatmospheric level and when the pressure in the chamber drops below a predetermined subatmospheric level. A rubber-like insert is disposed in the passageway to provide a concentric, axially downwardly facing valve seat, and a ball is disposed in the passageway to move against the valve seat to close the passageway against the movement of fluid from the chamber when the filler neck is tilted downwardly to a predetermined angle relative to a horizontal plane.

A further object of the present invention is to provide such a cap in which the pressure-vacuum valve means includes a subassembly inserted into said passageway, the subassembly including an outer shell sealably engaged with the wall of said passageway, the outer shell terminating with a downwardly extending, concentric lower portion having a vent opening for the valve means therein, the said rubber-like insert having an upper portion providing a seal about said vent opening.

Other objects and features of the present invention will become apparent as this description progresses.

Figure 1:
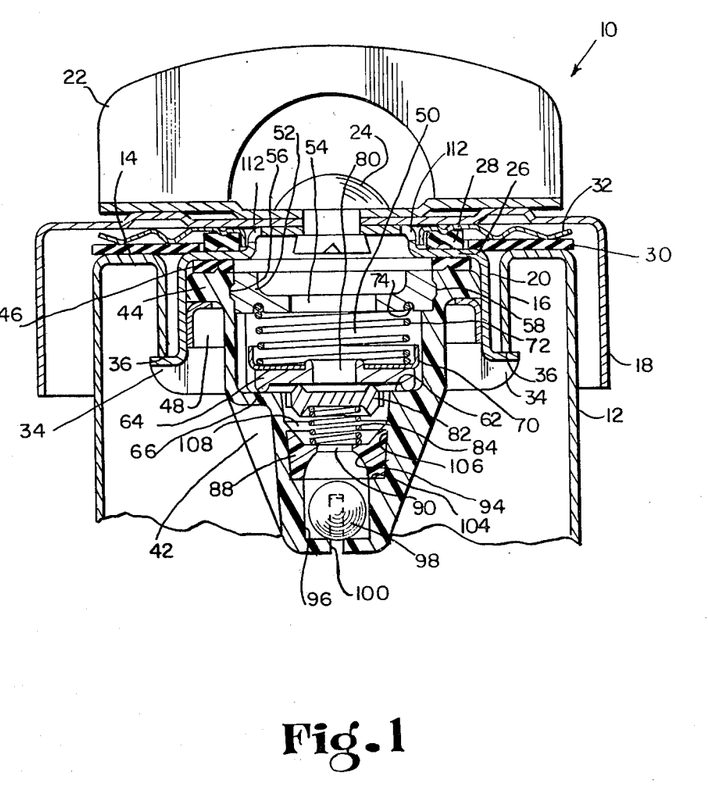
FIGS. 1, 2, 3 and 4 are sectional views of four different embodiments of the present invention.

Referring now to the drawings and particularly to FIG. 1, it will be seen that I have disclosed an embodiment 10 of the present invention for closing a filler neck 12 of the type having a peripherally and radially extending, upwardly facing sealing surface 14 concentric with the axis of the neck and, at the radially inner edge of that surface 14, a downwardly turned, peripherally extending flange 16 which has a cam profile edge as will be discussed hereinafter. The cap comprises an outer cover 18 to which a cup 20 and handle 22 are rigidly fastened by means of the concentric rivet 24, the cup 20 being a downwardly opening, generally cylindrical cup. The cup provides an upper shoulder 26 spaced axially apart from the cover 18 to define a space therebetween for an inner gasket 28, an outer gasket 30, and a diaphragm spring 32. The gasket 30 bears against both the shoulder 26 of the cup 20 and the sealing surface 14 of the filler neck to provide a seal between the cup 20 and the filler neck. Both the gaskets 28, 30 may be synthetic rubber gaskets and the diaphragm 32 may be a stainless steel diaphragm formed in cross section as illustrated to provide a spring for yieldably urging the outer peripheral edge of the gasket 30 downwardly. The cup 20 is formed with radially outwardly extending ears 34 which conventionally pass downwardly through notches in the sealing surface 14 in the flange 16 to engage the cam lock surface 36 defined by the distal edge of the flange 16. Twisting of the shell 18 by the handle 22, of course, conventionally rotates the cap to move the cup 20 axially inwardly to press the gasket 30 downwardly against the sealing surface 14.

The cup 20 and a valve housing or valve body 42 extending upwardly into the open end of the cup comprise housing means connected to the cover 18 and extending downwardly into the filler neck as discussed previously. The illustrative valve housing or valve body 42 comprises an upper, radially outwardly and peripherally extending shoulder 44 which captures a synthetic rubber gasket 46 between its upper surface and the downwardly facing surface of the shoulder 26 of the cup. A locking ring 48 is inserted into the cup and there locked by conventional means to secure the valve body 42 in its illustrated position. Indentations or tangs may be formed in the wall of the cup 20 to secure the ring 48.

It will be appreciated that the valve body 42 may preferably be a molded plastic shell having a bore extending most of the way axially therethrough defining a passageway 50. There is an upper plug 52 with a concentric opening 54 therein inserted into the upper end of the passageway 50. The passageway may be formed with a peripherally extending groove 56 and the plug 52 may have a peripherally and radially outwardly extending tongue 58 which snaps into engagement with that groove as illustrated.

It can be seen that the illustrative valve body 42 is provided with a peripherally and radially inwardly extending pressure valve seat 62 to be engaged by a disc-like valve member 64 which, in the illustrative embodiment, has a peripherally and downwardly extending sealing ridge 66 at its radially outer edge resting upon the valve seat 62. A spring cup 70 is conventionally placed upon the disc 64 and a coiled compression spring serves as the pressure spring means yieldably urging the valve member or gasket 64 into closing engagement with the valve seat 62. The upper end of the spring 72 is received in a concentric, downwardly opening groove 74.

The valve member 64 is provided with a concentric, vacuum vent opening 80 extending therethrough, and the embodiment 10 comprises a vacuum valve member 82 which is yieldably urged against the lower surface of the valve member 64 to close the vent opening 80 by a spring 84. In the illustrative embodiment, the lower end of the spring 84 rests upon another plug 88 which is inserted downwardly into the valve body before it is assembled to the cup 20 and which has a vent passageway 90 therethrough. This plug 88 is formed to provide a concentric, axially downwardly facing generally spherical valve seat 94 which is in registry with the lower portion 96 of the passageway through the valve body. A stainless steel ball 98 is disposed in the lower portion 96 of the passageway to roll freely therein. The distal end or lower end of the valve body is provided with a transaxially extending slot 100 which serves to vent the lower portion 96 of the passageway into the filler neck and chamber.

In the illustrative embodiment 10, the valve body 42 is formed to provide, in the passageway extending therethrough, a peripherally and radially inwardly extending ledge 104 upon which the plug 88 rests. The wall of the passageway above that ledge and the conforming wall of the plug is slightly conical flaring upwardly and slightly outwardly to integrally formed means 108 projecting inwardly. The plug 88 may be, for instance, soft enough or resilient enough to snap past the peripherally and inwardly extending projecting means 108 which serves to hold the plug 88 downwardly against the ledge 104.

The embodiment 10, and the embodiments 10A, 10B discussed hereinafter are constructed such that several different types of valve bodies 42 can be inserted into the open end of the cup 20 to be secured there. This gives considerable manufacturing flexibility in that a plurality of different types of valve bodies 42 can be fabricated as subassemblies having various pressure spring and vacuum spring calibrations to meet the various requirements. Then, such subassemblies can be selectively inserted into the cups 20 and secured there to complete the total cap assembly.

With the above description in mind, it will be appreciated that the pressure-vacuum valve means works in the following manner: When the pressure in the fuel tank exceeds a predetermined superatmospheric level, the calibrated spring 72 will compress to permit vapors in the tank to escape between the valve member 64 and the valve seat 62 upwardly and outwardly through peripherally spaced apart vent openings 112 in the cup 20 upper portion and then radially outwardly through upwardly projecting, downwardly opening troughs (not shown) in the top surface of the cover 18. Such troughs extend radially outwardly beyond the outer extent of the diaphragm 32 so that the vapors exhausted from the tank can escape from the filler neck. Then, when the pressure in the tank drops below a predetermined subatmospheric level, the calibrated spring 84 compresses to permit air to move from the atmosphere through the vent openings 112 and the vent opening 80 past the vacuum valve member 82 and into the tank.

In order to prevent the flow of fuel through the valve body 42 if the automobile rolls over, the lower passageway portion 96, ball 98 and spherical seat 94 are proportioned such that, as the car rolls over, the ball 96 will roll into the spherical seat to close the opening 90 through the plug 88.

Figure 2:
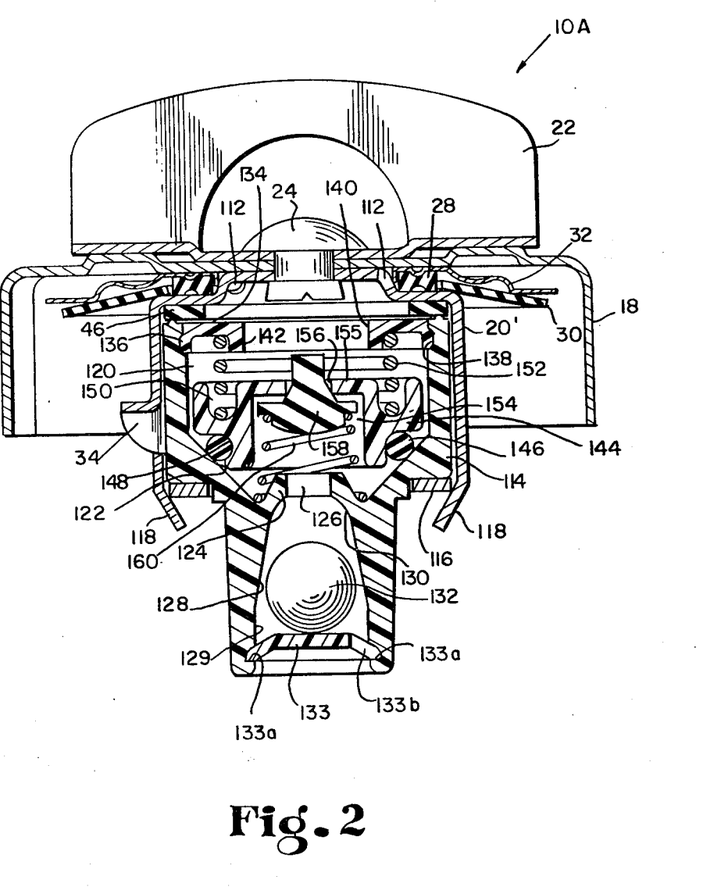
Figure 3:
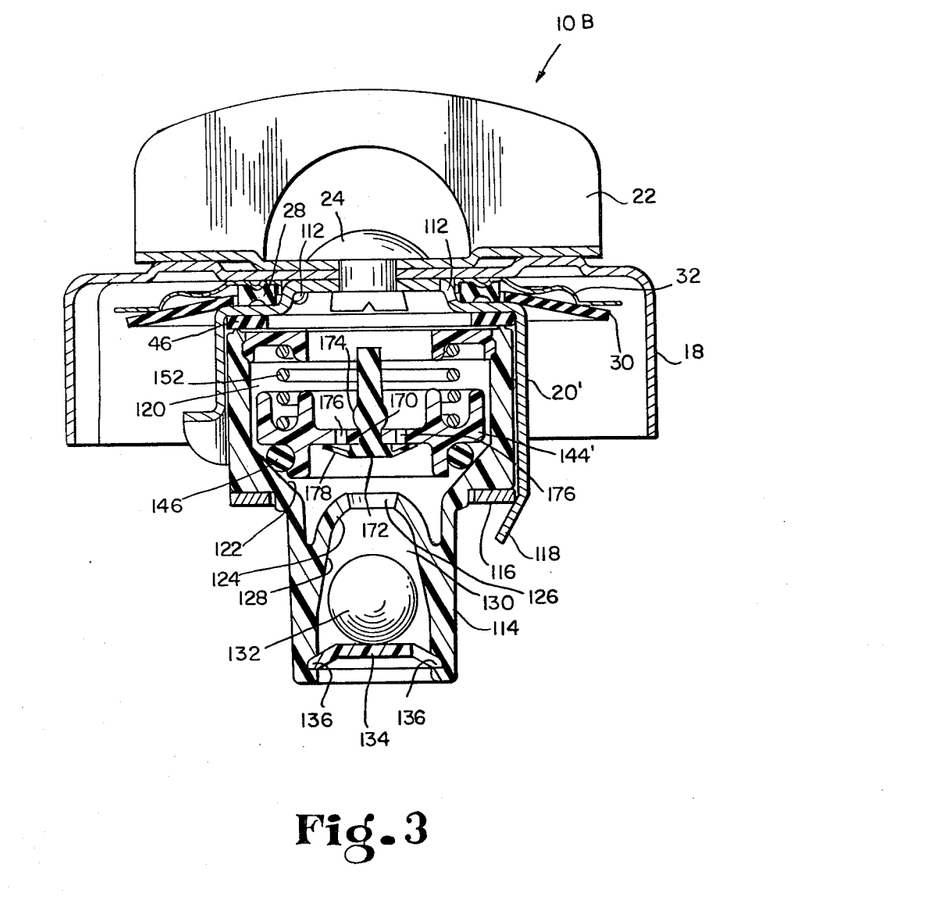

Referring now to FIGS. 2 and 3, like reference numerals representing like parts, and some reference numerals being primed to show changes in parts, it will be seen that different types of valve bodies can be inserted into and locked into the cup. In the embodiment 10A of FIG. 2, the valve housing or valve body is indicated by the reference numeral 114 and it is secured into the cup 20' by a metal washer 116 which is conventionally secured in place by bent inwardly tangs 118 provided on the distal edge of the cup. The axially upper portion of the passageway of the valve body 114 is formed to be concentric and cylindrical as indicated at 120 and to terminate therebelow with a concentric downwardly and inwardly extending conical seat portion 122. The lower region of the conical seat 122 terminates at a concentric and axially upwardly extending abutment 124 having a concentric opening 126 extending therethrough. The axially lower portion of the valve body 114 is formed to provide a lower passageway portion 128 which is, for a large part of its axial extent, slightly conically to flare downwardly and slightly outwardly to a lower cylindrical portion 129. The uppermost portion of the passageway 128 is formed to provide a concentric, axially downwardly facing generally spherical valve seat 130 in concentric registry with the opening 126. A stainless steel ball 132 is disposed in the passageway 128 portion to be movable therein into closing relationship with the vent opening 126. The ball 132 is retained in the passageway by means of a retainer 133 which may be snapped into the peripherally extending groove 133a, the retainer having vent openings therein as indicated by 133b.

The subassembly of the valve body 114 is completed or closed by inserting an upper plug 134 into the upper end of the passageway 120, the peripherally and outwardly extending tongue 136 of the plug snapping into engagement with the peripherally extending groove 138 in the passageway. The plug 134 has a vent opening 140 therethrough which is bounded by a peripherally and downwardly extending concentric rim 142. In this embodiment 10A, the pressure valve means includes a pressure valve member 144 having a concentric O-ring seal 146 which concentrically engages the conical seat 122, the ring being received in a concentric groove 148 formed in the valve member. The valve member 144 is also provided with an upwardly opening groove 150 receiving the lower end of the coiled compression spring 152, the upper end of which seats about the rim 142. In order to provide a vacuum valve means, the valve member 144 is provided with a downwardly opening hollow 154 defined by an upper, generally horizontally extending web portion 155 having a concentric vacuum vent opening 156 therethrough. A tapered plug-type valve member 158 is yieldably urged into closing engagement with that opening 156 by means of a coiled compression spring 160 which seats upon the aforesaid abutment 124. That spring 160 is, of course, the vacuum spring of the cap 10A.

Referring now specifically to FIG. 3, it will be seen that the primary difference between the structures of FIGS. 2 and 3 is in the shape of the valve members 144, 144' and the type of vacuum valve utilized. The valve member 144' of the embodiment 10B of FIG. 3 includes a center opening 170 into which a vacuum valve member 172 is inserted, the valve member 172 having an upwardly extending shaft with a bulbous portion 174 which passes upwardly through the opening 170 and which serves to secure the member 172 to the member 144'. Then, peripherally spaced apart about the center opening 170 are smaller vent openings 176. The valve member 172 is formed to have a peripherally and radially outwardly extending resilient flap portion overlying the vent openings 176. When the pressure in the tank drops below a predetermined subatmospheric level, the flap portion 178 of the valve member 172 deflects downwardly to permit movement of atmospheric air downwardly through the vent openings 176 into the tank.

Figure 4:
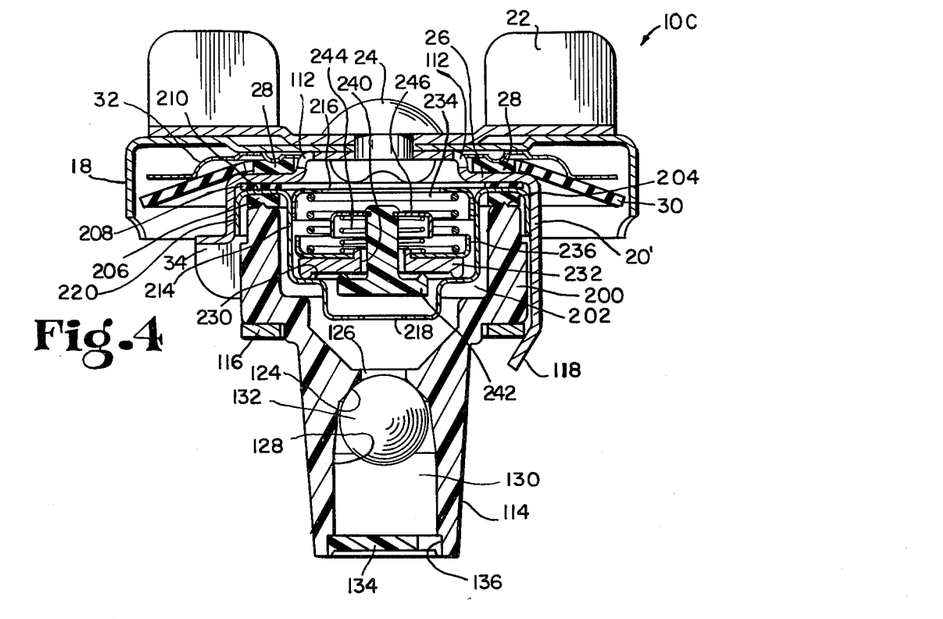
Figure 5:
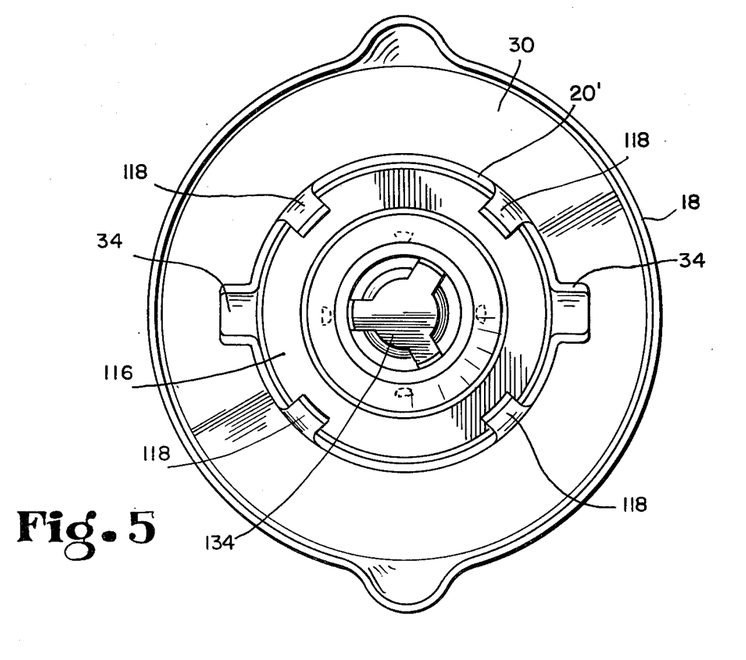
FIG. 5 is a bottom view of a cap taken from FIG. 4.

Referring now specifically to FIGS. 4 and 5, another embodiment of my invention will be discussed, this embodiment including a separate pressure-vacuum valve means subassembly inserted into the valve body. Many of the reference numerals used in FIGS. 4 and 5 are used in the first three figures to represent like parts.

A molded plastic valve body 200 having an axially extending cavity 202 is inserted upwardly into the cup 20' and secured there by means of a locking ring 116 and tabs 118. This valve body 200 provides, at its upper extent, a peripherally and radially extending shoulder 204 facing the base 26 of the cup 20'. A gasket 206 bears against this shoulder 204 and another gasket 208 bears against the cup base 26. Captured between these gaskets 204,208 is a peripherally and radially outwardly extending flange 210 of a metal outer shell 214 for the valve subassembly. This shell 214, which is generally cylindrical and which is concentrically received in the passageway 202, is formed to have an opening 216 in its upper end and another opening 218 in its lower end. The outer edge of the flange 210 is turned downwardly to provide a peripheral skirt 220 which engages against the internal diameter of the cup 20'. The gaskets 206, 208, of course, seal the valve subassembly to the body 200 providing the valve passageway 202 and to the cup 20'. As discussed in conjunction with the other views, the cup 20' is sealed to the filler neck 12 surface 14 by means of the gaskets 28, 30.

The shell 214 is formed to provide a peripherally and radially inwardly extending valve seat 230 against which the valve plate 232 of the pressure valve seats. A coiled compression spring 234 and spring plate 236 are provided for urging the plate 232 against the seat 230. The pressure valve plate 232 is provided with a central opening 240 therein as a vacuum valve opening, which opening is closed by a vacuum valve member 242 urged by a spring 244 to its normally closed position. A spring plate 246 is mounted on the upper end of the valve member 242 as a retainer for the spring 244.

The plastic body 200, of course, is formed to provide the downwardly facing conical valve seat 124 into which the ball 132 moves to close the opening 126.

One advantage, and perhaps a primary advantage, of the embodiment of FIGS. 4 and 5 is that the separate subassembly or pressure-vacuum subassembly is entirely contained within the shell 214 such that it can be tested separately from the rest of the structure. Different subassemblies having different pressure-vacuum characteristics can then be inserted into the assembly shown in FIG. 4.

Figure 6:
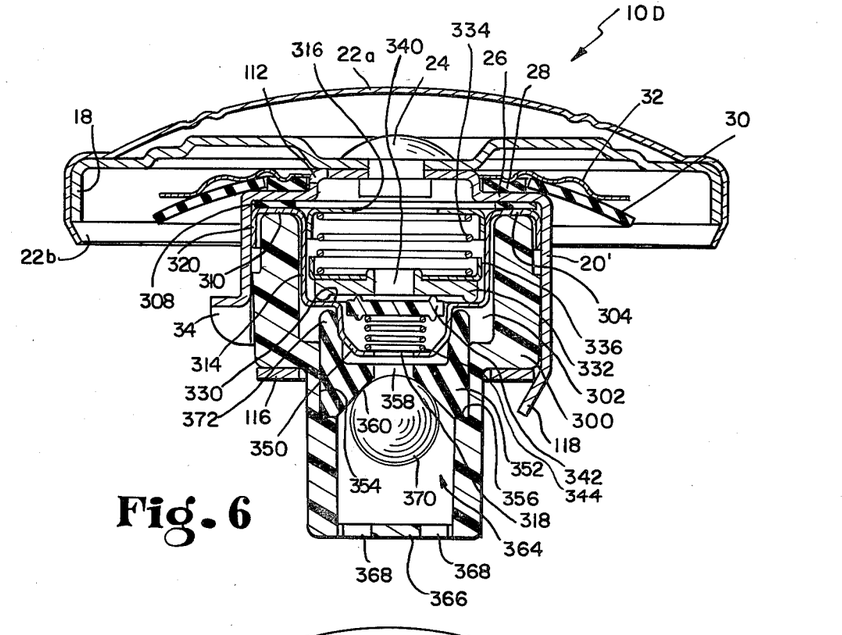
FIG. 6 is a sectional view of another embodiment of the present invention.
Figure 7:
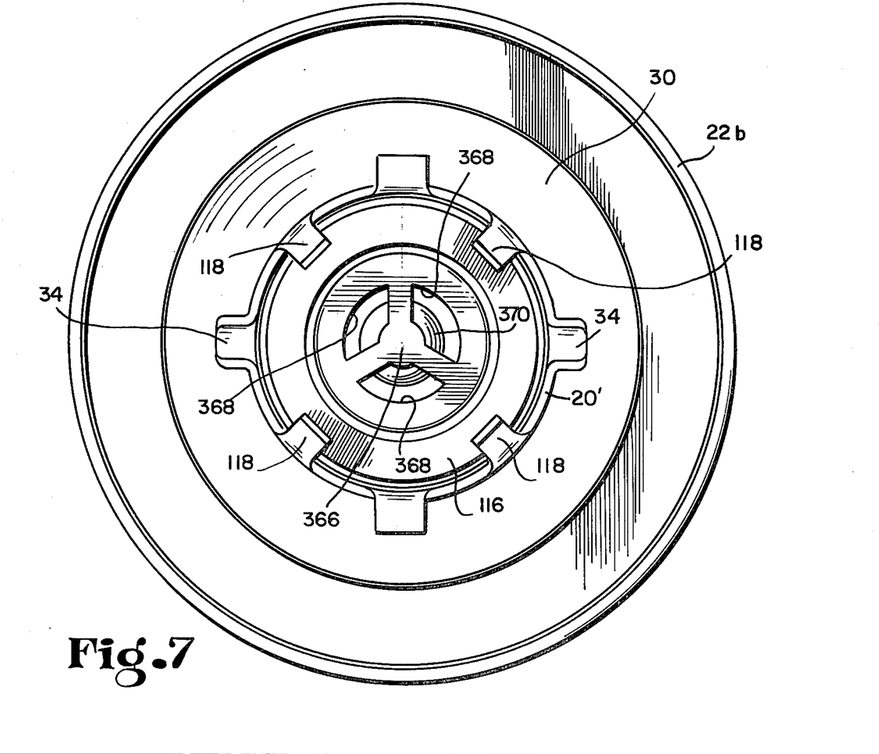
FIG. 7 is a bottom view of the cap of FIG. 6.

Referring now specifically to FIGS. 6 and 7, another embodiment of my invention will be discussed, this embodiment also including a pressure-vacuum valve means in the form of a subassembly inserted into the valve body. Many of the reference numerals used in FIGS. 6 and 7 are used in the first five Figures to represent like parts. For instance, instead of the turned up flange-type handles 22, a decorative cover 22a is disposed over the outer cover 18 and connected to the outer cover by the turned-in portion 22b.

In the embodiment of FIGS. 6 and 7, a molded plastic valve body 300 having an axially extending, concentric cavity 302 is inserted upwardly into the cup 20' and secured there by means of a locking ring 116 and tabs 118. This valve body 300 provides, at its upper extent, a peripherally and radially extending shoulder 304 facing the base 26 of the cup 20'. An annular gasket 308 bears against the cup base 26 in registry with the shoulder 304. Captured between the shoulder 304 and the gasket 308 is a peripherally and radially outwardly extending flange 310 of a sheet metal outer shell 314 for the valve means subassembly. This shell 314, which is generally cylindrical and which is concentrically received in the passageway 302, is formed to have an opening 316 in its upper end and another opening 318 in its lower end, both of these openings preferably being concentrically located. The outer edge of the flange 310 is turned downwardly to provide a peripheral skirt 320 which engages against the internal diameter of the cup 20'. The gasket 308, of course, seals the valve subassembly shell 314 to the cup 20' which, as discussed in conjunction with other views, is sealed to the filler neck 12 surface 14 by means of the gaskets 28,30.

The shell 314 is formed to provide a peripherally and radially inwardly extending, axially outwardly facing valve seat 330 against which the valve plate 332 of the pressure valve seats. A coiled compression spring 334 and spring plate 336 are provided for urging the plate 332 against the seat 330. The pressure valve plate 332 is provided with a central opening 340 therein as a vacuum valve opening, which opening is closed by a vacuum valve member 342 urged by a spring 344 to its normally closed position.

The outer shell 314 of the valve means subassembly is formed to provide a downwardly extending, concentric reduced portion 350 having the vent opening 318 formed therein. A rubber-like insert 352 is disposed in the passageway 302 to provide a valve seat for the roll-over valve means of the present invention, the insert 352 having a generally cylindrical outer wall telescopically received in the cylindrical wall 354 intermediate the ends of the passageway 302. The insert 352 rests upon a peripherally and radially inwardly extending ledge 356 as illustrated. The insert 352 has a concentric vent passageway 358 extending axially therethrough and, bounding that passageway, a conically shaped, axially downwardly facing concentric valve seat 360. The insert 352, therefore, divides the valve body passageway 302 into an upper portion receiving the subassembly shell 314 and a lower portion 364. This lower portion 364 is closed by a floor 366 having three vent openings 368 therethrough. A ball 370 is disposed in the lower portion 364 to roll against the valve seat 360 and close the passageway 368 and, consequently, the pressure-vacuum valve means when the filler neck tilts over a predetermined amount.

The upper portion 372 of the insert 352 is formed as a concentric sleeve snugly receiving the lower portion 350 of the shell 314 covering the pressure-vacuum valve assembly. This upper portion 372 tightly receives and seals against the lower portion 350 to seal the roll-over valve means to the pressure-vacuum valve means. This seal, for instance, eliminates the need for the gasket 206 shown in FIG. 4.

The soft, rubber-like insert 352 provides an ideal roll-over valve seat for the steel ball 370 as well as an ideal means for sealing against the outer shell 314 of the pressure-vacuum valve means.

I claim:
1. A pressure-vacuum cap for a vehicle fuel tank having a normally upwardly extending filler neck formed with a peripherally and radially extending, upwardly facing sealing surface concentric with the longitudinal axis of said neck, said cap comprising a cover, means providing a concentric housing extending downwardly into said filler neck and connected to said cover, said housing means including a valve body providing a centrally disposed concentric passageway extending axially therethrough and in communication with said tank, a pressure-vacuum valve subassembly disposed in said passageway for normalizing the pressure in such a tank, venting the tank to atmosphere when the pressure in the tank exceeds a predetermined superatmospheric level and when the pressure in the tank drops below a predetermined subatmospheric level, said subassembly including an outer closure shell, means providing a seal between said closure shell and said sealing surface of said filler neck, said shell terminating with an axially inner portion formed with a central vent opening therein, in which the improvement comprises a rubber-like insert disposed in said passageway axially inwardly from said shell, said insert having a concentric vent passageway extending axially therethrough and an axially downwardly facing valve seat bounding said vent passageway, said insert also having an upper portion in sealing engagement with said shell inner portion about said central vent opening, and a ball disposed in said passageway to move into closing engagement with said valve seat when the filler neck is tilted downwardly.

2. The improvement of claim 1 in which said insert upper portion is formed to receive and sealably engage said shell inner portion.

3. The improvement of claim 2 in which said valve body passageway is provided with an axially outwardly facing ledge upon which said insert rests, said housing means holding said shell downwardly in sealing engagement with said insert.

4. A pressure-vacuum cap for a vehicle fuel tank having a normally upwardly extending filler neck formed with a peripherally and radially extending sealing surface concentric with the longitudinal axis of said neck, said cap comprising a cover, a valve body providing a centrally disposed passageway extending axially therethrough concentric with and in communication with said filler neck, means for connecting said valve body to said cover so that said valve body extends axially downwardly into said filler neck, said valve body and its passageway having an axially upper end portion and an axially lower end portion, pressure-vacuum valve means disposed in the upper end portion of said passageway for normalizing the pressure in such a tank, venting the tank to atmosphere when the pressure in the tank exceeds a predetermined superatmospheric level and when the pressure in the tank drops below a predetermined subatmospheric level, said valve means including an axially downwardly projecting, generally concentric shell portion having a central vent opening therein, in which the improvement comprises a rubber-like insert disposed in the lower portion of said passageway and sealably engaging said shell portion about said vent opening, said insert having a venting passageway extending axially therethrough in communication with said vent opening, said insert being formed to have an axially downwardly facing concentric valve seat about its said venting passageway, and a ball disposed in the lower portion of said valve body passageway to move into closing engagement with said valve seat.

5. In a pressure-vacuum cap for a chamber having a normally upwardly extending filler neck formed with a peripherally and radially extending, upwardly facing sealing surface concentric with the longitudinal axis of said neck, said cap comprising a cover, means providing a concentric housing extending downwardly into said filler neck and connected to said cover, means providing a seal between said housing means and said sealing surface, said housing means including a valve body providing a centrally disposed concentric passageway extending axially therethrough and in communication with said chamber, pressure-vacuum valve means disposed in said passageway for normalizing the pressure in such a chamber, venting the chamber to atmosphere when the pressure in the chamber exceeds a predetermined superatmospheric level and when the pressure in the chamber drops below a predetermined subatmospheric level, said valve body including, in said passageway, a resilient plug providing a concentric, axially downwardly facing valve seat with a concentric venting opening extending axially therethrough, and a ball disposed in said passageway to move into closing engagement with said valve seat to close said passageway against the movement of fluid from said chamber when the filler neck is tilted downwardly to a predetermined angle relative to a horizontal plane, the improvement wherein said pressure-vacuum valve means includes an outer closure shell for housing a pressure-vacuum valve assembly, said shell terminating with an axially inner portion formed with a central vent opening therein, and said resilient plug comprising a rubber-like insert disposed in said passageway axially inwardly from said shell, said insert having a concentric vent passageway extending axially therethrough and an axially downwardly facing valve seat bounding said vent passageway, said insert also having an upper portion in sealing engagement with said shell axially inner portion about said central vent opening, and a ball disposed in said passageway to move into closing engagement with said valve seat when said filler neck is tilted downwardly.

* * * * *